(12) United States Patent
Ito et al.

(10) Patent No.: US 7,671,107 B2
(45) Date of Patent: Mar. 2, 2010

(54) CATIONIC POLYMERIZABLE RESIN COMPOSITION

(75) Inventors: Yuichi Ito, Sodegaura (JP); Yasushi Mizuta, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 31 days.

(21) Appl. No.: 10/584,461

(22) PCT Filed: Nov. 25, 2004

(86) PCT No.: PCT/JP2004/017508
§ 371 (c)(1), (2), (4) Date: Jun. 22, 2006

(87) PCT Pub. No.: WO2005/061583
PCT Pub. Date: Jul. 7, 2005

(65) Prior Publication Data
US 2007/0144400 A1 Jun. 28, 2007

(30) Foreign Application Priority Data
Dec. 22, 2003 (JP) ............................. 2003-423950

(51) Int. Cl.
*C08F 2/50* (2006.01)
*C08J 3/28* (2006.01)

(52) U.S. Cl. .......................... 522/168; 522/31; 522/66; 522/134; 522/135; 522/141; 522/178; 522/181; 428/411.1

(58) Field of Classification Search ............... 522/168, 522/170, 178, 181, 134, 135, 141, 31, 66
See application file for complete search history.

(56) References Cited

FOREIGN PATENT DOCUMENTS

| JP | 07-017958 A | 1/1995 |
|---|---|---|
| JP | 07-053711 A | 2/1995 |
| JP | 07-062082 A | 3/1995 |
| JP | 08-085775 A | 4/1996 |
| JP | 08-208832 A | 8/1996 |
| JP | 08-218296 A | 8/1996 |
| JP | 08-231938 A | 9/1996 |
| JP | 08-269392 A | 10/1996 |
| JP | 09-309950 A | 12/1997 |
| JP | 2002-060483 A | 2/2002 |
| JP | 2002-188025 A | 7/2002 |
| JP | 2003-055448 A | 2/2003 |

*Primary Examiner*—Sanza L McClendon
(74) *Attorney, Agent, or Firm*—Buchanan Ingersoll & Rooney PC

(57) ABSTRACT

It has been discovered that an initiation reaction is efficiently progressed to a propagation reaction by adding a compound that potentially or directly generates a carbocation to the polymerization system of a cationic ring-opening polymerizable compound, and thus the activation of polymerization is rendered. Namely, the present invention relates to a cationic polymerizable resin composition which is characterized by comprising (A) a compound having at least one functional group capable of cationic ring-opening polymerization in one molecular chain, (B) a cationic polymerization initiator, and (C) a compound to generate a carbocation by the action of active species generated from (B) the cationic polymerization initiator by electromagnetic wave or particle beam. According to the present invention, it has been discovered that the initiation reaction is efficiently progressed to the propagation reaction by adding the compound that potentially or directly generates a carbocation to the polymerization system of the cationic ring-opening polymerizable compound, and thus the activation of polymerization is rendered.

11 Claims, 1 Drawing Sheet

3-ethyl-3-phenoxymethyloxetane

CATIONIC POLYMERIZABLE RESIN COMPOSITION

TECHNICAL FIELD

The present invention relates to a cationic polymerizable resin composition excellent in reactivity upon the polymerization, which is useful for sealing resins, panel laminating resins, coating materials, adhesives, inks, various sealing materials, and the like.

BACKGROUND ART

Epoxy resins are excellent in heat resistance, adhesiveness, water resistance, mechanical strength, electric properties and so on, and thus have been used for sealing resins, panel laminating resins, coating materials, adhesives, inks, various sealing materials, and the like. As a method for curing epoxy resins, there has been known a light heat-curing system by cationic polymerization. Recently, cationic polymerization using an oxetane resin having an oxetanyl group in the molecular chain, besides an epoxy resin, has been widely investigated.

An oxetane resin has the following characteristics in comparison with an epoxy resin: (1) it is excellent in forming high molecular weight and material properties because the propagation reaction of polymerization is rapid; (2) it is excellent in processabilty and stability because an oxetanyl group does not have mutagenecity; and, (3) it is excellent in electric properties and moisture resistance because the generation of hydroxyl groups by polymerization is low. In addition to the above characteristics, the oxetane resin has the characteristics such as low curing shrinkage, low skin stimulation and inertness to oxygen, in comparison with a radical-polymerization system.

However, it has been difficult to use an oxetane resin alone because the initiation reaction is slow. Saegusa et al. 'Japanese Journal of Industrial Chemistry, 66, 474 (1963)' has reported that the curing rate was improved by adding an epoxy resin to an oxetane resin. In addition, Sasaki 'Radtech 2000, 61 (2000)' has reported that the initiation reaction occurred by an epoxy group and then the propagation reaction by an oxetanyl group was carried out, consequently accomplishing fast curing.

Further, Aoshima et al. 'Journal of Polymer Science Part A: Polymer Chemistry, 1719-1728, Volume 32, Issue 9' has reported that the polymerization of a vinyl ether is carried out in the manner of living polymerization when tetrahydrofuran as a cyclic ether is added to a cationic polymerization system using a vinyl ether and an alkylaluminum halide compound as a Lewis acid catalyst. However, they have also reported that when a compound having an oxetanyl group or an oxilane ring is added, the polymerization of a vinyl ether does not occur even in the same cyclic ether and polymer cannot be thus obtained.

[Patent Document 1] JP-A No. 1995-053711
[Patent Document 2] JP-A No. 1995-062082

DISCLOSURE OF THE INVENTION

Problems to be Solved by the Invention

However, a system in which the initiation reaction occurs by such an epoxy group and the propagation reaction by an oxetanyl group is subsequently carried out, does not yield sufficient curability yet, in comparison with photo-radical polymerization. Further, in applications demanding no skin stimulation, it has a disadvantage that skin stimulation is revealed by the addition of an epoxy resin.

The present invention is made to solve the above-mentioned problems and is aimed to provide a cationic polymerizable resin composition excellent in curability, which reveals sufficient curability equal to that of a photo-radical polymerization system and also does not use an epoxy resin that causes skin stimulation.

Means for Solving the Problems

As a result of sufficient investigation for the initiation reaction of a cationic ring-opening polymerizable compound, the present inventors have discovered that the initiation reaction is efficiently progressed to the propagation reaction by adding a compound which potentially or directly generates a carbocation to the polymerization system of the cationic ring-opening polymerizable compound so that the activation of polymerization is rendered, thus leading to completion of the present invention.

Namely, the present invention relates to a cationic polymerizable resin composition comprising (A) a compound having at least one functional group capable of cationic ring-opening polymerization and (B) a cationic polymerization initiator to generate active species by electromagnetic wave or particle beam, which further comprises (C) a compound to generate a carbocation by the action of the active species generated from (B) the cationic polymerization initiator by electromagnetic wave or particle beam, in an amount of 0.01 to 50.0% by weight based on 100% by weight of the sum of the components (A) and (C). In addition, the cationic polymerizable resin composition in which the component (C) is a vinyl ether and/or a reaction product of a vinyl ether with an organic carboxylic acid is preferable.

Also, the functional group capable of cationic ring-opening polymerization in the component (A) is preferably an oxetanyl group. Further, there are provided sealing agents, adhesives, painting materials, coating materials, inks and sealing materials comprising the composition according to the present invention.

Effects of the Invention

According to the present invention, it has been discovered that with respect to the initiation reaction of a cationic ring-opening polymerizable compound, the initiation reaction is efficiently progressed to the propagation reaction by adding a compound which potentially or directly generates a carbocation to the polymerization system of the cationic ring-opening polymerizable compound, by which the activation of polymerization is rendered.

BEST MODE FOR CARRYING OUT THE INVENTION

Figure 1:
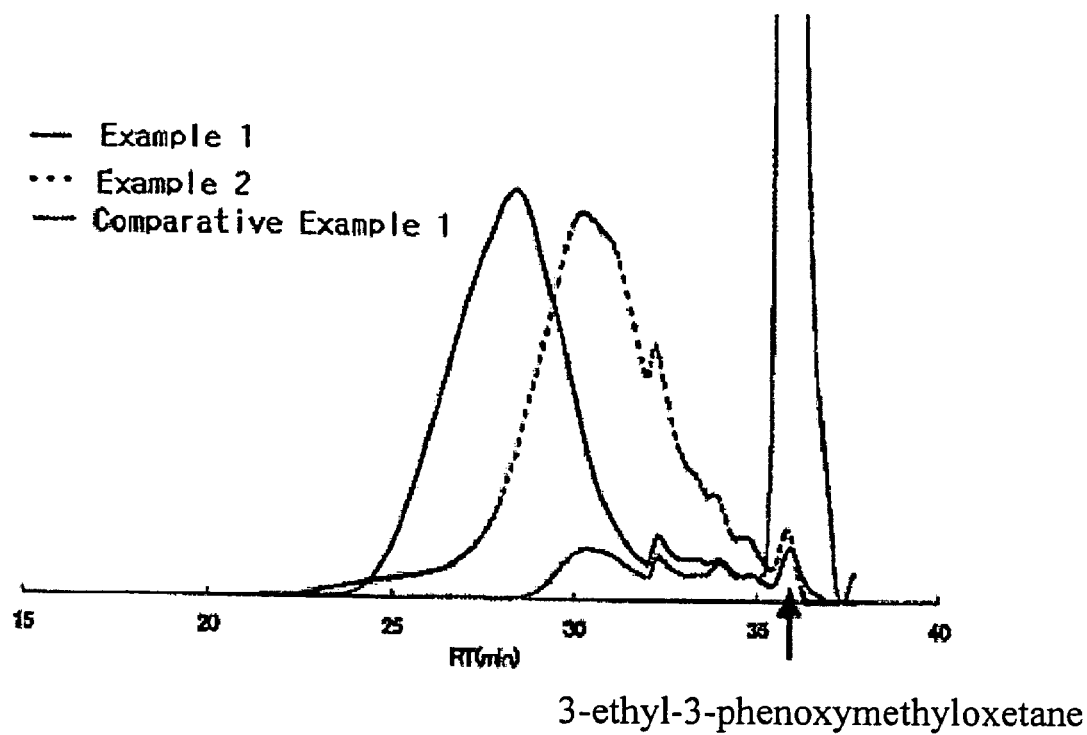
FIG. 1 shows GPC chromatograms of resin compositions of Examples 1 and 2 and Comparative Example 1.

Hereinafter, the present invention will be described in detail.

(A) Compound Having at Least One Functional Group Capable of Cationic Ring-Opening Polymerization The component (A) used in the present invention is a compound having at least one functional group capable of cationic ring-opening polymerization. Specific examples of the functional groups capable of cationic ring-opening polymerization may include cyclic ether, cyclic sulfide, cyclic imine, cyclic disulfide, lactone, lactam, cyclic formal, cyclic siloxane and the like, preferably, compounds having an oxilane ring and/or an oxetane ring where an oxonium ion is a growing species, and more preferably, compounds having an oxetanyl group.

The compounds having an oxetanyl group are specifically exemplified below. Specific examples of compounds having one oxetanyl group include: 3-ethyl-3-hydroxymethyloxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenylether, iso-butoxymethyl(3-ethyl-3-oxetanylmethyl)ether, iso-bornyloxyethyl(3-ethyl-3-oxetanylmethyl)ether, iso-bornyl(3-ethyl-3-oxetanylmethyl) ether, 2-ethylhexyl(3-ethyl-3-oxetanylmethyl)ether, ethyldiethyleneglycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl)ether, dicyclopentenylethyl(3-ethyl-3-oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, bornyl(3-ethyl-3-oxetanylmethyl) ether, and the like.

Specific examples of compounds having two oxetanyl groups include: 1,4-bis{((3-ethyl-3-oxetanyl)methoxy)methyl}benzene, bis{[(1-ethyl)3-oxetanyl]methyl}ether, 1,4-bis[(3-ethyl-3-oxetanyl)methoxy]benzene, 1,3-bis[(3-ethyl-3-oxetanyl)methoxy]benzene, 3,7-bis(3-oxetanyl)-5-oxa-nonane, 1,4-bis[(3-ethyl-3-oxetanylmethoxy)methyl]benzene, 1,2-bis[(3-ethyl-3-oxetanylmethoxy)methyl]ethane, 1,2-bis[(3-ethyl-3-oxetanylmethoxy)methyl]propane, ethyleneglycol bis(3-ethyl-3-oxetanylmethyl)ether, dicyclopentenyl bis(3-ethyl-3-oxetanylmethyl)ether, triethyleneglycol bis(3-ethyl-3-oxetanylmethyl)ether, tetraethyleneglycol bis(3-ethyl-3-oxetanylmethyl)ether, tricyclodecanediyldimethylene bis(3-ethyl-3-oxetanyl methyl)ether, 1,4-bis[(3-ethyl-3-oxetanylmethoxy)methyl]butane, 1,6-bis[(3-ethyl-3-oxetanylmethoxy)methyl]hexane, polyethyleneglycol bis(3-ethyl-3-oxetanylmethyl)ether, EO-modified bisphenol A bis(3-ethyl-3-oxetanylmethyl)ether, PO-modified bisphenol A bis(3-ethyl-3-oxetanylmethyl)ether, EO-modified hydrogenated bisphenol A bis(3-ethyl-3-oxetanyl methyl)ether, PO-modified hydrogenated bisphenol A bis (3-ethyl-3-oxetanyl methyl)ether, EO-modified bisphenol F bis(3-ethyl-3-oxetanylmethyl)ether, and the like.

Specific examples of compounds having three or more oxetanyl groups include: trimethylolpropane tris(3-ethyl-3-oxetanylmethyl)ether, pentaerythritol tris(3-ethyl-3-oxetanylmethyl)ether, pentaerythritol tetrakis(3-ethyl-3-oxetanylmethyl)ether, dipentaerythritol pentakis(3-ethyl-3-oxetanylmethyl)ether, and the like.

Such cationic ring-opening polymerizable compounds having oxetanyl groups may be used alone or in combination of two or more kinds.

(B) Cationic Polymerization Initiator to Generate Active Species by Electromagnetic Wave or Particle Beam The component (B) used in the present invention is a cationic polymerization initiator to generate active species by electromagnetic wave or particle beam. The cationic polymerization initiator as the component (B) is not particularly limited as long as it is capable of initiating cationic polymerization. In this regard, the electromagnetic wave or particle beam is not particularly limited, but may include, for example, microwave, infrared, visible light, ultraviolet, X-ray, Y-ray, electron beam, and the like, preferably, among those, ultraviolet which is conveniently available is used. In addition, a light source for ultraviolet is not particularly limited, but, preferably, a mercury lamp and a metal halide lamp are used.

Preferable examples of the cationic polymerization initiator as the component (B) may include onium salts. The onium salts are compounds to generate a Lewis acid by photoreaction. Specifically, it is represented by the following general formula (1):

$$[R1_a R2_b R3_c R4_d W]^{M+}[MX_{n+m}]^{m-} \qquad (1)$$

wherein the cation is an onium ion; W is S, Se, Te, P, As, Sb, Bi, O, I, Br, Cl, or N≡N; R1, R2, R3, and R4 are the same or different organic groups; a, b, c and d are an integer from 0 to 3, respectively, and (a+b+c+d) is equal to a valence number of W; M is a metal or metalloid forming the central atom of the halogenated complex $[MX_{n+m}]$, for example, B, P, As, Sb, Fe, Sn, Bi, Al, Ca, In, Ti, Zn, Sc, V, Cr, Mn, Co, or the like; X is a halogen atom, for example, F, Cl, Br, or the like; m is a net charge of the halogenated complex ion; and, n is an atomic valence of M). The iodonium salts are more preferable.

Specific examples include compounds comprising a combination of onium ions such as diphenyl iodonium, 4-methoxydiphenyl iodonium, bis(4-methylphenyl) iodonium, bis (4-tert-butylphenyl)iodonium, bis(dodecylphenyl) iodonium and the like, and anions such as tetrafluoroborate, hexafluorophosphate, hexafluoroantimonate, hexafluoroarsenate, hexachloroantimonate and the like. In addition, as the onium salts commercially available, there may be mentioned CGI552 (Trade Name, manufactured by UNION CARBIDE CO.), WPI-113 (Trade Name, manufactured by Wako Pure Chemical Industry Ltd.), 2074 (Trade Name, manufactured by Rhodia Inc.), and the like.

The above cationic polymerization initiators may be used alone or in combination of two or more kinds. In addition, when the cationic polymerizable resin composition according to the present invention is polymerized by electromagnetic wave or particle beam, a sensitizer, a photo-radical initiator and the like can be added for use. Further, it is possible that the polymerization is performed by electromagnetic wave or particle beam combined with heat.

(C) Compound to Generate a Carbocation by the Action of Active Species Generated from (B) the Cationic Polymerization Initiator by Electromagnetic Wave or Particle Beam The component (C) used in the present invention is a compound to generate a carbocation by the action of the active species generated from the cationic polymerization initiator by electromagnetic wave or particle beam. The component (C) is not limited as long as it generates a carbocation. As a compound to generate a carbocation, there may be mentioned compounds which generate a carbocation by an acid-generating agent, a Lewis acid, and the like used in cationic polymerization, or compounds which generate a carbocation for themselves, but, preferably, a vinyl compound, and/or a structure which can generate a carbocation, formed by adducting a protic acid to a vinyl compound. For example, there may be mentioned styrenes, vinyl ethers and dienes. More preferably, a vinyl ether and/or a reaction product of a vinyl ether with an organic acid are used in the present invention.

As the vinyl ethers, there may be specifically mentioned compounds having a vinyl ether group with single functionality, such as alkyl-substituted vinyl ethers such as methyl vinyl ether, ethyl vinyl ether, propyl vinyl ether, butyl vinyl ether, iso-butyl vinyl ether, tert-butyl vinyl ether, n-octadecyl vinyl ether, 2-ethylhexyl vinyl ether, and the like.

In addition, there may be mentioned vinyl ethers which are obtained by a desalting reaction of an alcoholate which is generated from the reaction of 2-chloroethyl vinyl ether, an alcohol, sodium metal and the like, using a phase-transfer catalyst such as quaternary butylammonium iodide, etc. As a vinyl ether having a hydroxyl group, there may be mentioned 2-hydroxyethyl vinyl ether, diethyleneglycol monovinyl ether, and 4-hydroxybutyl vinyl ether.

As a vinyl ether having a special structure, compounds containing a polymerizable vinyl ether group and a cyclic ether group in the molecular chain, such as 2,3-dihydrofuran, can be used in the present invention. In addition, as a compound having a vinyl ether group with plural functionality, there may be mentioned 1,4-butane diol divinyl ether, diethyleneglycol divinyl ether, ethyleneglycol divinyl ether, and the like.

As the component (C) in the present invention, such vinyl ethers may be used alone or in a mixture thereof. In this case, the cationic polymerization initiator is activated by electromagnetic wave or particle beam, and thus, a vinyl ether reacts with moisture present in the resin composition which acts as a co-catalyst so as to rapidly generate a carbocation, by which the initiation reaction occurs and is progressed to the propagation reaction of a compound having a functional group capable of cationic ring-opening polymerization so that the polymerization is carried out.

Further, compounds to generate a carbocation by an electron-withdrawing reagent such as Lewis acids and the like are also used as the component (C) in the present invention. That is, a reaction product of a vinyl ether with an organic carboxylic acid, which is previously prepared, specifically, a compound having a structure of 1-alkoxyethyl ester of an organic carboxylic acid is also used as the component (C) in the present invention. As a method for obtaining this reaction product of the vinyl ether with the organic carboxylic acid, the method disclosed in Sadahito Aoshima and Toshinobu Higashimura, Macromolecules, 1989, 22, 1009 can be used, or in the case of an organic carboxylic acid having an electron-withdrawing substituent, such as trifluoroacetic acid, the reaction product of the vinyl ether with the organic carboxylic acid can be obtained only by mixing with the vinyl ether at room temperature.

Also, examples of an organic carboxylic acid which is additionally reacted with a vinyl ether may include a single functional organic carboxylic acid such as acetic acid, trifluoroacetic acid, trichloroacetic acid, dichloroacetic acid, monochloroacetic acid, benzoic acid, salicylic acid, propionic acid, pivaric acid, butyric acid, fatty acid, cinnamic acid, pyruvic acid, (meth)acrylic acid, and the like. Further, a bifunctional organic carboxylic acid may include oxalic acid, tartaric acid, malic acid, succinic acid, malonic acid, phthalic acid, adipic acid, fumaric acid, maleic acid, and the like. Furthermore, a trifunctional organic carboxylic acid may include citric acid, trimellitic acid, and the like. Also, a tetrafunctional organic carboxylic acid may include pyromellitic acid. In addition, polymers having an organic carboxylic acid may be used. Specifically, there may be mentioned polymers in which (meth)acrylic acid is contained in the copolymerization components, maleic polyolefins in which maleic anhydride is grafted on polyolefins, and the like.

By mixing these organic carboxylic acids with excess vinyl ethers in an equivalent ratio with respective to the above-exemplified vinyl ethers, the organic carboxylic acids are adducted to the vinyl ethers, and then, the unreacted vinyl ethers are removed by distillation and the like for purification, so as to obtain the compounds as the component (C) of the present invention.

In the cationic polymerizable composition according to the present invention, the cationic polymerization initiator (B) is activated by electromagnetic wave or particle beam to generate materials that initiate photo-cationic polymerization, and thus the polymerization is initiated.

In the cationic polymerizable resin composition according to the present invention comprising (A) a compound having at least one functional group capable of cationic ring-opening polymerization and (B) a cationic polymerization initiator producing active species by electromagnetic wave or particle beam, (C) a compound producing a carbocation by the action of the active species generated from (B) the cationic polymerization initiator by electromagnetic wave or particle beam, the component (C) is contained in an amount of 0.01 to 50.0% by weight based on 100% by weight of the sum of the components (A) and (C), and the component (B) is contained in an amount of 0.5 to 10.0 parts by weight based on 100 parts by weight of the sum of the components (A) and (C). When the composition ratio of (A), (B) and (c) is in these ranges, sufficient curability is revealed, and thus, a decrease in water resistance or coloration of the resins does not occur in practical applications.

Also, preferably, the component (C) is contained in an amount of 0.01 to 10.0% by weight based on 100% by weight of the sum of the components (A) and (C), and the component (B) is contained in an amount of 1.0 to 5.0 parts by weight based on 100 parts by weight of the sum of the components (A) and (C).

If necessary, other resins may be combined as a copolymerization component and blend component in the composition according to the present invention. As the copolymerizable component, other cationic ring-opening polymerizable compounds maybe combined. As the other cationic ring-opening polymerizable compounds, there may be mentioned the above-described compounds having cyclic ethers, cyclic sulfides, cyclic imines, cyclic disulfides, lactones, latams, cyclic formals, cyclic siloxanes, and the like.

In applications irrelevant to skin stimulation, compounds having an oxilane ring that is the same cyclic ether as an oxetane ring, can be used. Specific examples of the compounds having one oxilane ring include phenyl glycidyl ether, butyl glycidyl ether, and the like. As the compounds having two oxilane rings, there may be mentioned glycidyl ethers such as hexanediol diglycidyl ether, tetraethyleneglycol diglycidyl ether, trimethylolpropane triglycidyl ether, bisphenol A diglycidyl ether, bisphenol F diglycidylether, novolac glycidyl ether, hexahydrophthalic acid glycidyl ester, dimmer acid glycidyl ester, tetraglycidyl aminodiphenyl methane, 3,4-epoxy-6-methylcyclohexylmethyl carboxylate, triglycidyl isocyanurate, 3,4-epoxy cyclohexylmethyl carboxylate, polypropylene diglycidyl ether, polybutadiene or polysulfide modified with diglycidyl ether at both ends thereof, and the like. Also, an aliphatic cyclic epoxy such as 3,4-epoxy cyclohexylmethyl-3,4-epoxycyclohexane carboxylate, bis-(3,4-epoxycyclcohexyl)adiphate and the like may be mentioned. These cationic ring-opening polymerizable compounds may be used alone or in combination with two or more kinds.

Other resin components as a blend component may include, for example, polyamide, polyamideimide, polyurethane, polybutadiene, polypropylene, polyether, polyester, styrene-butadiene-styrene block copolymer, petroleum resin, xylene resin, ketone resin, cellulose resin, fluorine-based oligomer, silicon-based oligomer, polysulfide-based oligomer, and the like. These may be used alone or in combination of plural kinds.

As a modifier, there may be mentioned, for example, an aiding agent for initiating polymerization (photosensitizer), an anti-aging agent, a leveling agent, a wetting improver, a tackifier, a plasticizer, a surfactant, a UV absorbent, a photoradical initiator, and the like. These may be used alone or in combination of plural kinds. A diluent can be used to impart or improve coating ability. As the diluent, common organic solvents can be used.

Further, the composition according to the present invention is useful for sealing agents for various flat panel displays, such as seal materials for liquid crystal, seal materials for organic EL, and the like. Furthermore, the composition according to the present invention is useful for various adhesives for metals, inorganic materials including glasses or ceramics, and plastics. Likewise, the composition according to the present invention is useful for painting materials, coating materials, inks and sealing materials that have different forms of use.

EXAMPLES

Hereinafter, the present invention will be described in details with reference to examples and comparative examples, but the invention is not limited thereto.

(Curability) The compositions obtained in the examples and comparative examples were respectively dropped on to a glass plate (4.5 cm×2.0 cm×0.1 cm) on which a fluorine-based film of 100 μm is positioned as a spacer, and then the glass plate was covered by other glass plate (4.5 cm×2.0 cm×0.1 cm) to obtain the samples for evaluation. These samples for evaluation were irradiated with light of 1.0 J/cm$^2$ transmitted through a glass plate using a metal halide lamp, and immediately after the irradiation, one of the glass plates was exfoliated and then visually evaluated for the degree of curing on the surface thereof. The degree of curing is represented by ◯ for one that was cured to a tack-free, Δ for one where only the surface was cured or that had tack on the surface, and X for one that was not cured at all.

(Synthesis of an adduct of iso-butyl vinyl ether-acetic acid [iso-butoxy ethyl acetate])

A 2-L (liter), four-necked flask equipped with a thermometer, a stirrer, a rectification column, a condenser, a inlet tube for nitrogen gas and a dropping funnel was charged with 500.0 g (5.0 mol) of iso-butyl vinyl ether, and 199.7 g (3.3 mol) of acetic acid was dropped thereto from the dropping funnel at room temperature under nitrogen gas atmosphere. Then, the temperature was raised to 60° C. and the reaction was continuously carried out for 3 hours for completion.

Next, the obtained material was purified by distillation (61° C./20 mmHg) over calcium hydride, the purity thereof was analyzed by gas chromatography to be 99.9% (area percentage), and the structure thereof was confirmed by $^1$H-NMR, so as to obtain the product which was used as the component (C) in the present invention.

Example 1

In an opaque brown bottle, 94.0 parts by weight of 3-ethyl-3-phenoxy methyl oxetane (aronoxetane OXT-211, manufactured by TOAGOSEI CO., LTD.) as (A) a compound having at least one functional group capable of cationic ring-opening polymerization in one molecular chain, and 1.6 parts by weight of (tolylcumyl)iodonium tetrakis(pentafluorophenyl)borate (RHODORSIL PHOTOINITIATOR 2074, manufactured by Rhodia Inc.) as (B) a cationic polymerization initiator were mixed and dissolved. To this solution, 6.0 parts by weight of iso-butyl vinyl ether as (C) a compound having a vinyl ether group was added, mixed again and dissolved to obtain the cationic resin composition according to the present invention.

This cationic resin composition was evaluated in accordance with the above-described evaluation method, and the results are shown in Table 3.

Example 2

In an opaque brown bottle, 94.0 parts by weight of 3-ethyl-3-phenoxy methyl oxetane (aronoxetane OXT-211, manufactured by TOAGOSEI CO., LTD.) as (A) a compound having at least one functional group capable of cationic ring-opening polymerization in one molecular chain, and 1.6 parts by weight of (tolylcumyl)iodonium tetrakis(pentafluorophenyl)borate (RHODORSIL PHOTOINITIATOR 2074, manufactured by Rhodia Inc.) as (B) a cationic polymerization initiator were mixed and dissolved. To this solution, 6.0 parts by weight of iso-butoxy ethyl acetate (which was synthesized by the aforementioned method, as (C) a reaction product of a vinyl ether with an organic carboxylic acid, was added, mixed again and dissolved, to obtain a cationic resin composition according to the present invention.

This cationic resin composition was evaluated in accordance with the aforementioned evaluation method, and the results are shown in Table 3.

Examples 3~10

Formulating in the same manner as in Example 1 or 2, except that the kinds and amounts of (A) a compound having at least one functional group capable of cationic ring-opening polymerization in one molecular chain, (C) a vinyl ether and/or a reaction product of a vinyl ether with an organic carboxylic acid, and (B) a cationic polymerization initiator were varied as shown in Table 1, evaluations were carried out by the above-described method, and the results are shown in Table 3.

Comparative Example 1

After the cationic resin composition which does not contain (C) a vinyl ether and/or a reaction product of a vinyl ether with an organic carboxylic acid was obtained in the above Example 1, this cationic resin composition was evaluated by the same evaluation method as in Example 1, and the results are shown in Table 3.

Comparative Example 2

After the cationic resin composition which does not contain (C) a vinyl ether and/or a reaction product of a vinyl ether with an organic carboxylic acid was obtained in the above Example 3, this cationic resin composition was evaluated by the same evaluation method as in Example 3, and the results are shown in Table 3.

Comparative Example 3

In an opaque brown bottle, 94.0 parts by weight of 3-ethyl-3-phenoxy methyl oxetane (aronoxetane OXT-211, manufactured by TOAGOSEI CO., LTD.) as (A) a compound having at least one functional group capable of cationic ring-opening polymerization in one molecular chain, 6.0 parts by weight of phenyl glycidyl ether, and 1.6 parts by weight of (tolylcumyl) iodonium tetrakis(pentafluorophenyl)borate (RHODORSIL PHOTOINITIATOR 2074, manufactured by Rhodia Inc.) as (B) a cationic polymerization initiator were mixed and dissolved to obtain a cationic resin composition.

This cationic resin composition was evaluated in accordance with the above-described evaluation method, and the results are shown in Table 3.

TABLE 1

| Name of Formulated Components | Examples |||||||||| 
|---|---|---|---|---|---|---|---|---|---|---|
| | 1 | 2 | 3 | 4 | 5 | 6 | 7 | 8 | 9 | 10 |
| (A) 3-Ethyl-3-phenoxy methyl oxetane | 94.0 | 94.0 | | 94.0 | 99.99 | 90.0 | 50.0 | 50.0 | 94.0 | 94.0 |
| Bis (3-ethyl-3-oxetanylmethyl) ether | | | 94.0 | | | | | | | |
| (B) RHODORSIL PHOTOINITIATOR 2074 | 1.6 | 1.6 | 1.6 | 1.6 | 1.6 | 1.6 | 1.6 | 1.6 | 0.5 | 9.0 |
| Iso-butyl vinyl ether | 6.0 | | 6.0 | | | | | 50.0 | | |
| (C) 1,4-butanediol divinyl ether | | | | 6.0 | | | | | | |
| Iso-butoxy ethyl acetate | | 6.0 | | | 0.01 | 10.0 | 50.0 | | 6.0 | 6.0 |

TABLE 2

| Name of Formulated Components | Comparative Examples |||
|---|---|---|---|
| | 1 | 2 | 3 |
| (A) 3-Ethyl-3-phenoxy methyl oxetane | 100.0 | | 94.0 |
| Bis(3-ethyl-3-oxetanylmethyl)ether | | 100.0 | |
| Phenyl glycidyl ether | | | 6.0 |
| (B) RHODORSIL PHOTOINITIATOR 2074 | 1.6 | 1.6 | 1.6 |
| (C) Iso-butyl vinyl ether | | | |
| 1,4-butanediol divinyl ether | | | |
| Iso-butoxy ethyl acetate | | | |

TABLE 3

| | Examples |||||||||| Comparative Examples |||
|---|---|---|---|---|---|---|---|---|---|---|---|---|---|
| Evaluation item | 1 | 2 | 3 | 4 | 5 | 6 | 7 | 8 | 9 | 10 | 1 | 2 | 3 |
| Curability | ○ | ○ | ○ | ○ | ○ | ○ | ○ | ○ | ○ | ○ | X | X | Δ |
| Remarks | | | | | | | | | | | Not cured as in liquid state | Not cured as in liquid state | The cross section not cured |

In order to clarify the differences in curability, the glass plates after UV irradiation for 1 hour with respect to Example 1, Example 2 and Comparative Example 1 were immersed in tetrahydrofuran (THF), and then a molecular weight of a soluble portion thereof was measured. In addition, an insoluble portion existed with respect to Example 2. Gel permeation chromatography (GPC) was used as a method for the measurement. The GPC was carried out using a high speed liquid chromatograph (SYSTEM11, GPC KF806L×3, manufactured by Showa Denko KK) using tetrahydrofuran as an eluent, and the chromatograms by a differential refractometer are shown in FIG. 1.

The polymerization was clearly confirmed with respect to Examples 1 and 2, while, with respect to Comparative Example 1, it was confirmed that a polymer was formed in a little amount and that the monomer, 3-ethyl-3-phenoxy methyl oxetane remained in a large amount.

INDUSRIAL APPLICABILITY

The present invention provides a cationic ring-opening polymerizable resin composition excellent in curability, and the cationic polymerizable resin composition according to the present invention can be used for sealing resins, panel laminating resins, coating materials, adhesives, inks, various sealing materials, and the like.

The invention claimed is:

1. A cationic polymerizable resin composition comprising (A) a compound having at least one functional group capable of cationic ring-opening polymerization and (B) a cationic polymerization initiator to generate active species by electromagnetic wave or particle beam, which further comprises (C) a compound to generate a carbocation by the action of the active species generated from (B) the cationic polymerization initiator by electromagnetic wave or particle beam, in an amount of 0.01 to 10.0% by weight based on 100% by weight of the sum of the components (A) and (C), wherein the composition does not contain an epoxy compound, and wherein the component (B) is contained in an amount of 0.5 to 10.0 parts by weight based on 100 parts by weight of the sum of the components (A) and (C), and the component (B) is represented by the following formula (1):

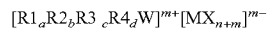

$$[R1_a R2_b R3_c R4_d W]^{m+}[MX_{n+m}]^{m-}$$

wherein the cation is an onium ion; W is I; R1, R2, R3, and R4 are the same or different organic groups; a, b, c and d are an integer from 0 to 3, respectively, and (a+b+c+d) is equal to a valence number of W; M is B, P, As, Sb, Fe, Sn, Bi, Al, Ca, In, Ti, Zn, Sc, V, Cr, Mn or Co; X is a halogen atom selected from F, Cl and Br, or $C_6F_5$; m is a net charge of the halogenated complex ion; and n is an atomic valence of M.

2. The composition according to claim 1, wherein the component (C) is a vinyl ether and/or a reaction product of a vinyl ether with an organic carboxylic acid.

3. The composition according to claim 1, wherein the functional group capable of cationic ring-opening polymerization in the component (A) is an oxetanyl group.

4. A sealing agent comprising the composition according to claim 1.

5. An adhesive comprising the composition according to claim 1.

6. A painting material comprising the composition according to claim 1.

7. A coating material comprising the composition according to claim 1.

8. An ink comprising the composition according to claim 1.

9. A sealing material comprising the composition according to claim 1.

10. The composition according to claim 1, wherein in the formula (1), M is B, P or As.

11. The composition according to claim 1, wherein the compound (B) is (tolylcumyl)iodonium tetrakis(pentafluorophenyl)borate or a compound comprising a combination of an onium ion selected from the group consisting of diphenyl iodonium, 4-methoxydiphenyl iodonium, bis(4-methylphenyl)iodonium, bis(4-tert-butylphenyl)iodonium and bis(dodecylphenyl)iodonium and an anion selected from the group consisting of tetrafluoroborate, hexafluorophosphate and hexafluoroarsenate.

* * * * *